US012656669B2

(12) United States Patent
Zhu et al.

(10) Patent No.: US 12,656,669 B2
(45) Date of Patent: Jun. 16, 2026

(54) LIGHT SOURCE SYSTEM AND LASER PROJECTION DISPLAY DEVICE

(71) Applicant: Huawei Technologies Co., Ltd., Shenzhen (CN)

(72) Inventors: Dingjun Zhu, Dongguan (CN); Zhenlin Xie, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 711 days.

(21) Appl. No.: 18/060,489

(22) Filed: Nov. 30, 2022

(65) Prior Publication Data

US 2023/0105608 A1 Apr. 6, 2023

Related U.S. Application Data

(63) Continuation of application No. PCT/CN2021/097365, filed on May 31, 2021.

(30) Foreign Application Priority Data

Jun. 2, 2020 (CN) .......................... 202010491313.7

(51) Int. Cl.
G03B 21/20 (2006.01)
G02B 27/01 (2006.01)
G02F 1/35 (2006.01)

(52) U.S. Cl.
CPC ......... G03B 21/206 (2013.01); G02B 27/017 (2013.01); G02F 1/3532 (2013.01); (Continued)

(58) Field of Classification Search
None
See application file for complete search history.

(56) References Cited

U.S. PATENT DOCUMENTS 5,894,489 A 4/1999 Halldorsson et al.
6,480,325 B1 11/2002 Batchko et al.
(Continued)

FOREIGN PATENT DOCUMENTS

CN 1694318 A 11/2005
CN 1713691 A 12/2005
(Continued)

OTHER PUBLICATIONS

A.Jechow et al:"Blue-green light generation using high brilliance edge emitting diode lasers" , Laser and Photonics Reviews , vol. 4, No. 5, Sep. 1, 2010 (Sep. 1, 2010) , pp. 633-655 , XP055134771.

*Primary Examiner* — Bao-Luan Q Le
*Assistant Examiner* — Danell L Owens
(74) *Attorney, Agent, or Firm* — WOMBLE BOND DICKINSON (US) LLP

(57) ABSTRACT

This application provides a light source system and a laser projection display device. The light source system and the laser projection display device are applied to the field of laser projection display. The light source system includes an infrared laser light source and a nonlinear optical crystal array. An input end of the nonlinear optical crystal array is connected to an output end of the infrared laser light source, the nonlinear optical crystal array is configured to: perform frequency conversion on an infrared laser generated by the infrared laser light source, and output a laser obtained after the frequency conversion, the infrared laser light source is a pump light source, the nonlinear optical crystal array includes at least one nonlinear optical crystal.

20 Claims, 8 Drawing Sheets

(52) U.S. Cl.
  CPC ......... *G02F 1/354* (2021.01); *G03B 21/2033*
    (2013.01); *G03B 21/208* (2013.01); *G02B*
    *2027/0178* (2013.01)

(56)             References Cited

U.S. PATENT DOCUMENTS

2008/0075130 A1*  3/2008  Mizuuchi ............. H04N 9/3129
                                  348/E9.026
2009/0040596 A1*  2/2009  Mizuuchi ............. G02F 1/3501
                                  359/328
2010/0085631 A1*  4/2010  Kusukame ........... G02F 1/3525
                                  359/328
2014/0341241 A1* 11/2014  Essaian ................. H01S 5/4093
                                  372/34

FOREIGN PATENT DOCUMENTS

| | | | |
|---|---|---|---|
| CN | 1900805 A | * | 1/2007 |
| CN | 101485210 A | | 7/2009 |
| CN | 104064950 A | | 9/2014 |
| CN | 104283103 A | | 1/2015 |
| CN | 106992429 A | | 7/2017 |
| JP | H0521878 A | | 1/1993 |
| JP | 2000164950 A | * | 6/2000 |
| JP | 2004133429 A | * | 4/2004 |
| JP | 2010185981 A | * | 8/2010 |
| JP | 2011154275 A | | 8/2011 |
| JP | 5817022 B2 | | 11/2015 |
| JP | 2016526677 A | | 9/2016 |
| JP | 2016526699 A | | 9/2016 |
| JP | 2016177057 A | | 10/2016 |
| JP | 2017103271 A | | 6/2017 |
| WO | 2006006701 A1 | | 1/2006 |
| WO | 2007013513 A1 | | 2/2007 |
| WO | 2008114512 A1 | | 9/2008 |

* cited by examiner

LIGHT SOURCE SYSTEM AND LASER PROJECTION DISPLAY DEVICE

CROSS-REFERENCE TO RELATED APPLICATIONS

This application is a continuation of International Application No. PCT/CN2021/097365, filed on May 31, 2021, which claims priority to Chinese Patent Application No. 202010491313.7, filed on Jun. 2, 2020. The disclosures of the aforementioned applications are hereby incorporated by reference in their entireties.

TECHNICAL FIELD

This application relates to the field of laser projection display, and more specifically, to a light source system and a laser projection display device.

BACKGROUND

A laser projection display technology (LPDT) is a display technology that uses a laser of three primary colors (RGB) of red (R), green (G), and blue (B) as a light source, and can most truly reproduce a colorful and gorgeous color of an objective world, and provide more shocking performance.

Currently, laser light sources of a laser projection display device mainly include an edge-emitting laser (EEL) and a vertical cavity surface emitting laser (VCSEL). However, such a laser light source has a relatively complex structure, relatively high power consumption, a relatively large volume, and a relatively complex packaging process, and beam quality of the laser light source is relatively poor, and therefore the laser light source is difficult to meet an actual requirement of a laser projection display device such as a portable or wearable device.

SUMMARY

This application provides a light source system and a laser projection display device. The light source system has a simple structure, a small volume, and relatively low power consumption, and is easy to package, and therefore fundamentally meets requirements of high beam quality, low power consumption, a simplified packaging architecture, and a low-cost packaging process.

According to a first aspect, a light source system is provided. The light source system includes an infrared laser light source and a nonlinear optical crystal array. An input end of the nonlinear optical crystal array is connected to an output end of the infrared laser light source, the nonlinear optical crystal array is configured to: perform frequency conversion on an infrared laser generated by the infrared laser light source, and output a laser obtained after the frequency conversion, the infrared laser light source is a pump light source, the nonlinear optical crystal array includes one or more nonlinear optical crystals, each nonlinear crystal is configured to output a single-mode Gaussian beam, an output end of the nonlinear optical crystal array outputs a coaxial visible Gaussian laser beam, and the coaxial visible Gaussian laser beam provides a light source for laser projection display.

In the light source system provided in the first aspect, an infrared laser may be used as a pump light source, and the pump light source may be understood as a light source that can excite wavelength conversion of a nonlinear crystal. The infrared laser light source is used to replace a visible-light semiconductor laser light source to greatly reduce power consumption of the laser light source. A plurality of nonlinear optical crystals are used to perform frequency conversion on the infrared laser generated by the infrared laser light source. Phases of infrared lasers on which different nonlinear optical crystals can perform frequency conversion are different. The nonlinear crystal outputs a visible coaxial Gaussian beam, and the coaxial visible Gaussian beam has a round spot, and has relatively high beam quality, and therefore, is helpful for increasing projection display resolution and may be used as a light source of a laser display device. In addition, the light source system has a simple structure and a relatively small volume, and therefore fundamentally meets requirements of high beam quality, low power consumption, simplified packaging, and a low-cost packaging process.

In this embodiment of this application, the infrared laser generated by the infrared laser light source may cause electrons in the nonlinear crystal to rise (or "be pumped") from a lower energy level to a higher energy level in atoms or molecules, so that a wavelength or a frequency of the infrared laser can be converted in the nonlinear crystal.

In an embodiment, power consumption of the infrared laser light source may be less than or equal to 20 milliwatts (mW).

In an embodiment, a beam output by each nonlinear optical crystal is a visible Gaussian beam, and the visible Gaussian beam has a round spot.

In an embodiment, when the nonlinear optical crystal array includes a plurality of nonlinear optical crystals, wavelengths of infrared lasers on which any two nonlinear optical crystals perform frequency conversion are different.

In an embodiment, there may be one infrared laser light source. When there is one infrared laser light source, a wavelength range of an infrared laser generated by the infrared laser light source includes wavelengths before the one or more nonlinear optical crystals included in the nonlinear optical crystal array perform frequency conversion. In other words, the infrared laser light source may generate an infrared laser or near infrared light of wavelengths matching the one or more nonlinear optical crystals. For example, the infrared laser light source may be a large-bandwidth pump light source (where for example, a wavelength range is $\Delta\lambda \geq 150$ nm).

In an embodiment, when there is one infrared laser light source, the infrared laser light source may generate an infrared laser whose wavelength range is 980 nm to 1280 nm, or the infrared laser light source may generate an infrared laser whose wavelength range is 980 nm to 1064 nm.

In an embodiment of the first aspect, when the nonlinear optical crystal array includes a plurality of nonlinear optical crystals, the plurality of nonlinear optical crystals are connected in series. The series connection manner may mean that the plurality of nonlinear optical crystals are arranged in a straight line. An output end of the first nonlinear optical crystal is connected to an input end of the second nonlinear optical crystal, and an output end of the second nonlinear optical crystal is connected to an input end of the third nonlinear optical crystal. In other words, the plurality of nonlinear optical crystals are separately connected by using heads and tails, and the nonlinear optical crystal array has only one input end and one output end as a whole. In this implementation, the infrared laser generated by the infrared laser light source can be directly transmitted to the plurality of nonlinear optical crystals in sequence, and therefore the infrared laser can pass through all the nonlinear optical crystals without requiring another optical device to change a transmission path of the infrared light. In addition, infrared lasers are combined into one visible light by using the nonlinear optical crystal for transmission, so that a completely coaxial visible Gaussian laser beam can be generated. A structure is simple and easy to implement, so that complexity of the light source system is further reduced.

In an embodiment, the plurality of nonlinear optical crystals may not be connected in series. In this case, an optical device needs to be used to process the infrared laser generated by the infrared laser light source, so that the infrared laser generated by the laser light source can pass through the nonlinear optical crystals.

In an embodiment of the first aspect, the nonlinear optical crystal array includes one or more of a multi-harmonic generation crystal, a sum-frequency crystal, a difference-frequency crystal, an optical parametric generation crystal, an optical parametric amplification crystal, and an optical parametric oscillation crystal.

In an embodiment, the plurality of nonlinear optical crystals include a red multi-harmonic generation crystal, a blue multi-harmonic generation crystal, and a green multi-harmonic generation crystal. For example, the red multi-harmonic generation crystal may multiply a frequency of a laser of a wavelength 1280 nm to generate a red laser of a wavelength 640 nm. The green multi-harmonic generation crystal may multiply a frequency of a laser of a wavelength 1064 nm to generate a green laser of a wavelength 532 nm. The blue multi-harmonic generation crystal may multiply a frequency of a laser of a wavelength 980 nm to generate a green laser of a wavelength 480 nm.

In an embodiment of the first aspect, when there are a plurality of infrared laser light sources, wavelengths of infrared lasers generated by different infrared laser light sources are different, the light source system further includes a multi-beam combination module, an input end of the multi-beam combination module is connected to output ends of the plurality of infrared laser light sources, an output end of the multi-beam combination module is connected to the input end of the nonlinear optical crystal array, and the multi-beam combination module is configured to: combine infrared lasers emitted by the plurality of infrared laser light sources into one infrared laser beam, and transmit the infrared laser beam to the nonlinear optical crystal array. In this implementation, the multi-beam combination module is used to ensure that the infrared lasers generated by the plurality of infrared laser light sources can be transmitted to the one or more nonlinear optical crystals, thereby ensuring efficiency of processing, by the one or more nonlinear optical crystals, the infrared lasers generated by the plurality of infrared laser light sources.

In an embodiment, there are three infrared laser light sources. The first infrared laser light source may generate an infrared laser of a wavelength 1280 nm, the second infrared laser light source may generate an infrared laser of a wavelength 1064 nm, and the third infrared laser light source may generate an infrared laser of a wavelength 980 nm.

In an embodiment of the first aspect, when there is one infrared laser light source, the light source system further includes a collimator, an input end of the collimator is connected to an output end of the infrared laser light source, an output end of the collimator is connected to the input end of the nonlinear optical crystal array, and the collimator is configured to: collimate an infrared laser emitted by the infrared laser light source, and transmit the collimated infrared laser to the nonlinear optical crystal array. In this implementation, a collimation degree of infrared lasers input to the one or more nonlinear optical crystals can be ensured, so that infrared laser quality and efficiency of performing frequency conversion by the one or more nonlinear optical crystals are improved.

In an embodiment, the collimator may be a fast axis collimator.

In an embodiment of the first aspect, a variable optical attenuator is disposed before each nonlinear optical crystal, and the variable optical attenuator is configured to adjust power of an infrared laser of a wavelength corresponding to the nonlinear optical crystal. In this implementation, power ratio modulation may be performed on infrared lasers input to each nonlinear optical crystal (for example, power ratio modulation is performed on RGB lasers), to control output power of the infrared lasers.

In an embodiment, the variable optical attenuator may be an electrically variable optical attenuator.

In an embodiment of the first aspect, the light source system further includes an achromatic collimator, an input end of the achromatic collimator is connected to the output end of the nonlinear optical crystal array, and the achromatic collimator is configured to collimate a beam output by the nonlinear optical crystal array. In this implementation, the achromatic collimator may collimate beams output by the one or more nonlinear optical crystals, so that quality of a beam output by the light source system can be improved.

In an embodiment of the first aspect, the light source system further includes a filter, the filter is disposed at the output end of the nonlinear optical crystal array, and the filter is configured to filter the beam output by the nonlinear optical crystal array. In this implementation, the filter is connected, so that quality of an infrared laser output by the light source system can be improved.

According to a second aspect, a laser projection display device is provided. The laser projection display device includes the light source system provided in any one of the first aspect and the embodiments of the first aspect.

For example, the laser projection display device provided in this application includes a projection objective lens and the light source system provided in any one of the first aspect and the embodiments of the first aspect, an output end of the light source system is connected to the projection objective lens, and the projection objective lens is configured to transmit, to a projection display screen, a coaxial visible Gaussian laser beam output by the light source system.

For example, the laser display device provided in this application may be an AR device, a VR device, an HUD device, a mobile phone projection display device, a laser projection display device, a microprojection display device, or a near-eye display device.

DESCRIPTION OF EMBODIMENTS

Figure 1:
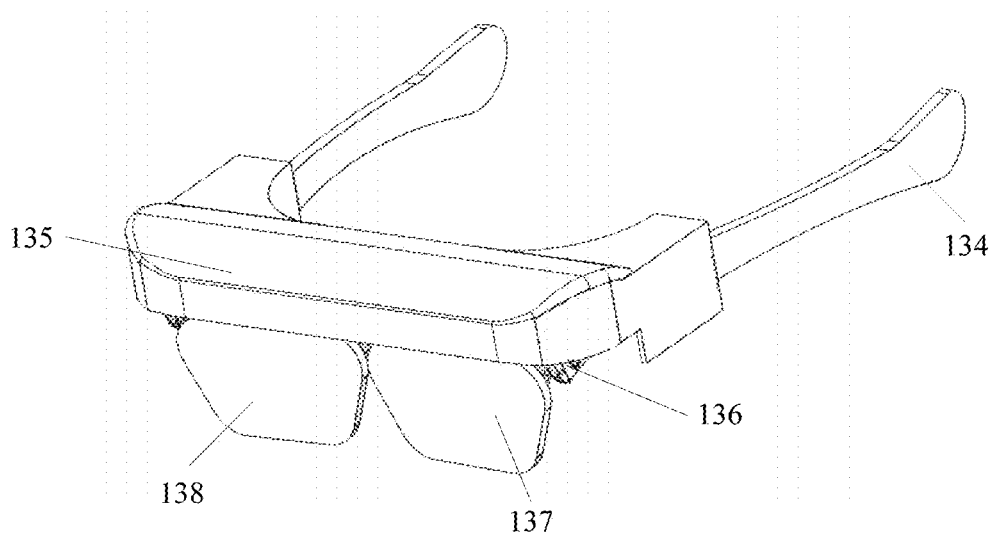
FIG. 1 is a schematic diagram of a structure of an example of AR glasses according to an embodiment of this application.

The following describes the technical solutions of this application with reference to the accompanying drawings.

In descriptions of embodiments of this application, "I" means "or" unless otherwise specified. For example, A/B may represent A or B. In this specification, "and/or" describes only an association relationship for describing associated objects, and indicates that three relationships may exist. For example, A and/or B may represent the following three cases: Only A exists, both A and B exist, and only B exists. In addition, in the descriptions of embodiments of this application, "a plurality of" means two or more than two.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more.

A laser projection display technology, which may also be referred to as a laser projection technology or a laser display technology, is a display technology that uses a laser of three primary colors (RGB) of red, green, and blue as a light source, and can most truly reproduce a colorful and gorgeous color of an objective world, and provide more shocking performance. From a perspective of colorimetry, a color gamut coverage rate of laser projection display can reach more than 90% of a color space that can be recognized by human eyes, and is at least twice that of a conventional color gamut coverage rate. This completely breaks through a limitation of a color gamut space of a previous display technology, and realizes perfect color restoration in the human history, so that people can see a most real and most gorgeous world by using display terminals. Table 1 shows comparison between related parameters of a laser projection display technology and a conventional light-emitting diode (LED) display technology.

TABLE 1

| Item | Conventional LED display technology | Laser projection display technology |
|---|---|---|
| Color gamut | <70%@Rec.2020 | >90%@Rec.2020 |
| Contrast | >500:1 | ≥2000:1 |
| Power consumption | ≥4000 mW | ≤500 mW |
| Volume of an optical engine | ≥10000 mm³ | ≤500 mm³ |

It can be learned from Table 1 that the laser projection display technology is significantly better than the conventional LED display technology.

Currently, featuring no need of a physical display surface, no need to perform focusing, low power consumption, a small volume, and a long service life, a scanning and projection device based on a laser and a microelectro mechanical system (MEMS) is increasingly valued by the industry in fields such as laser microprojection, augmented reality (AR), and virtual reality (VR), and is quite suitable for portable and wearable display application scenarios, a laser microprojection field, and the like. For example, a current portable projector named MP-CL1A has dimensions of 15 cm×7.6 cm×1.3 cm and a weight of only 210 grams. A projection system of a robot ROBOHON launched by another manufacturer is located only in a head with an outer diameter of approximately 40 mm. There are also AR glasses for retinal medical examination, AR glasses with a simplified architecture based on a monochromatic vertical cavity surface emitting laser (VCSEL), AR glasses with a three-color simplified architecture based on an RGB laser light source, and the like on the market.

Currently, laser light sources that can be used for portable and wearable laser projection display mainly include an edge-emitting laser (EEL) and a vertical cavity surface emitting laser (VCSEL). Because the edge-emitting laser (which may also be referred to as an edge-emitting semi-conductor laser) performs edge-emitting, an output beam of the edge-emitting laser has a large divergence angle, and has an elliptical spot. Further, output beams of the edge-emitting semiconductor laser further need to be combined and shaped. Therefore, an optical path architecture of the edge-emitting semiconductor laser is relatively complex. In addition, because of a characteristic of a semiconductor material, power consumption is relatively high. Therefore, the edge-emitting semiconductor laser is less competitive in a near-eye display field with quite high cost, size, power consumption, and beam quality requirements. The VCSEL light source has many advantages such as low power consumption, high beam quality, and a round spot. However, due to a limitation of a technology, only a red VCSEL is commercially used in a current stage, and a blue VCSEL and a green VCSEL cannot be commercially used in a short time, and therefore cannot be used as color laser display light sources. To improve competitiveness of laser projection display in future product applications, an RGB laser light source with low costs, a smaller size, lower power consumption, higher beam quality, and high wavelength accuracy is required.

Currently, in a related technology, a Fabry-Perot (F-P) edge-transmitting semiconductor laser bare die is used as an RGB laser light source, to implement collimation of three beams by using a collimator array and then perform optical path beam combination by using a band-pass filter. In this solution, the bare die is directly bonded to the inside of a ceramic package, and a collimator and the package are directly integrated to compress a device volume. However, in this solution, because the collimator is fastened to the package of the laser light source, active collimation coupling of beams cannot be implemented. Therefore, submicron-level passive mounting needs to be performed on the laser die, and a beam quantity can hardly meet a relatively high collimation degree requirement. In addition, the F-P light source is characterized by fast and slow axis elliptic spots, and therefore the collimated beam is still an ellipse, affecting laser projection display resolution. Currently, because of a capability of a die industry chain in the industry, output of a laser light source with low power consumption cannot be implemented, and because of a limitation of a laser die structure, and a round Gaussian spot and a small beam divergence angle cannot be directly obtained through collimation. Consequently, this solution has a quite poor effect.

Alternatively, a silicon substrate may be produced through precision processing, so that a processed silicon substrate can direct a plurality of visible light beams of different wavelengths to one beam combination channel. The silicon substrate designs, by using narrow bandwidth and high polarization characteristics of a laser, different coupling channels corresponding to different wavelengths, to implement beam combination of an RGB laser light source. Because beams are combined by using a single-mode waveguide, combined beams have completely consistent coaxial performance, and beam quality can completely meet Gaussian spot distribution. However, in this solution, light sources still rely on a semiconductor laser light source, and a current semiconductor R/G/B laser die still has high power consumption, and can hardly meet a requirement of a wearable device with a higher requirement for low power consumption.

In addition, red, green, and blue laser dies may be mounted to the inside of a package of a laser light source at equal intervals, and a lens array is used to perform beam collimation and focus all beams on one point, so that a focusing angle of the beams is approximately 2.75°. When a projection display light source is produced, a microelectro mechanical system (MEMS) is disposed at the focal point of the three beams of light. In this way, a pattern with three separated colors appears on a projection screen, and finally an image that matches an actual image is obtained through software timing correction. An entire laser light source module includes only the laser dies and the lens array, so that laser module packaging of 6 mm×5 mm×3.5 mm can be implemented. In this solution, miniaturization and simplified-architecture packaging of the RGB laser module are implemented. However, because an included angle between beams cannot be excessively large (theoretically cannot exceed 3°) during beam focusing, based on this requirement, assuming that the laser dies are mounted at intervals of 1.0 mm and a length of an optical path along which a collimated beam arrives at the MEMS is L=(1.0/tan 3)=19 mm, an entire optical path system is still quite long, and power consumption of the laser die is still restricted by existing laser die performance, and therefore a light source module with lower power consumption cannot be obtained.

It can be learned that currently, there is no RGB laser light source that has a small volume, a simple structure, low power consumption, and high beam quality and that is easy to package.

In view of this, this application provides a light source system. An infrared laser light source with lower power consumption is used as a pump light source, and a nonlinear optical crystal that can implement a single-mode Gaussian round spot is used as a laser generation medium to perform frequency conversion on an infrared laser generated by the infrared laser light source, to generate a visible Gaussian laser beam with different colors. The visible Gaussian laser beam provides a light source for a laser display device. The light source system has a simple structure, a small volume, and relatively low power consumption, and is easy to package, and therefore fundamentally meets requirements of high beam quality, low power consumption, a simplified packaging architecture, and a low-cost packaging process.

The light source system provided in this application may be applied to fields such as AR, VR, a head up display (HUD), mobile phone projection display, laser projection display, microprojection display, and near-eye display and related devices.

First, a laser projection display device provided in embodiments of this application is briefly described. The laser projection display device provided in embodiments of this application includes the light source system provided in this application. For example, the laser projection display device provided in this application may be an HUD device, a mobile phone projection display device, a microprojection display device, or a near-eye display device (an AR device or a VR device). This is not limited in embodiments of this application. In the laser projection display device provided in this application, the light source system has a simple structure, a small volume, and relatively low power consumption, and is easy to package.

The following uses an example in which the laser projection display device is AR glasses to describe the laser projection display device provided in this application. FIG. 1 is a schematic diagram of a structure of AR glasses according to an embodiment of this application. As shown in FIG. 1, the AR glasses include a holder 134, a light source system 135, a focused photonics component 136, and projection objective lenses 137 and 138. The light source system is any one of the following light source systems provided in embodiments of this application, and the light source system 135 is configured to generate a visible Gaussian laser beam. The holder 134 is used by a user to wear the AR glasses, the focused photonics component 136 is configured to transmit the visible Gaussian laser beam to the projection objective lenses 137 and 138 through refraction, reflection, or the like, and the projection objective lenses 137 and 138 are configured to transmit the visible Gaussian laser beam to a projection display screen or a display wall. After the user wears the AR glasses, turns on a switch of the light source system 135, and obtains, by using the AR glasses, information about an image or a pattern that needs to be displayed through projection, the AR glasses may display the image or the pattern on the projection display screen or the display wall.

It should be understood that the example shown in FIG. 1 is merely a schematic diagram of a structure of an example of AR glasses provided in this application, and does not constitute any limitation on a structure of the AR glasses provided in this application. For example, the structure of the AR glasses provided in this application may include more structural parts. This is not limited in this embodiment of this application.

The following specifically describes the light source system provided in embodiments of this application.

Figure 2:
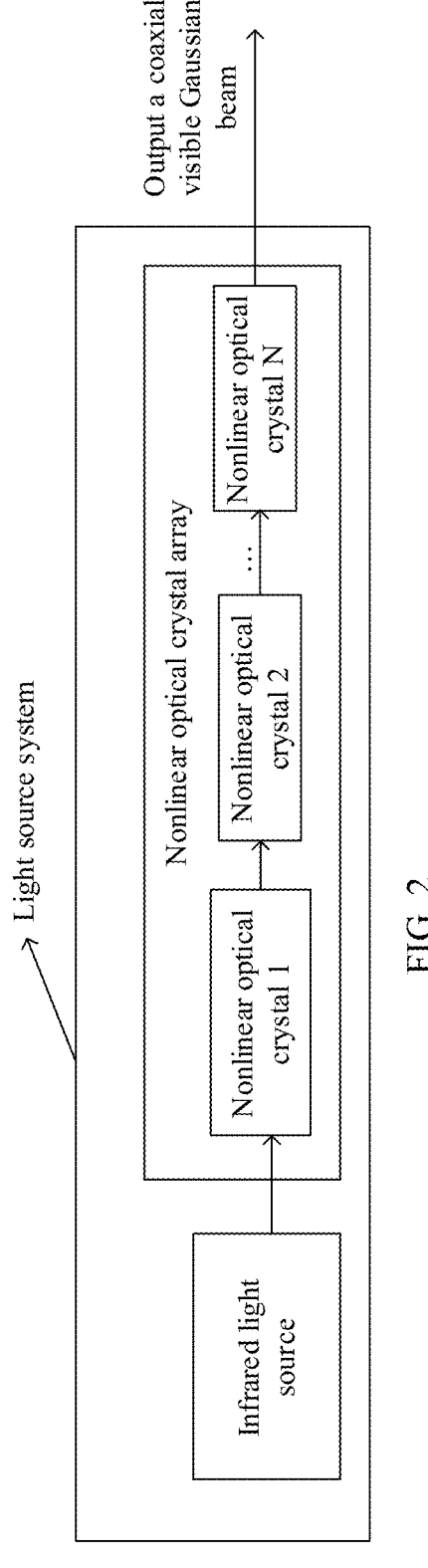
FIG. 2 is a schematic diagram of a structure of a light source system according to an embodiment of this application.

FIG. 2 is a schematic diagram of a structure of an example of a light source system according to this application. As shown in FIG. 2, the light source system includes:

one or more infrared laser light sources, configured to generate infrared lasers. The example shown in FIG. 2 shows a schematic diagram of one infrared laser light source. A direction shown by arrows in FIG. 2 is a transmission direction of an infrared laser. The infrared laser emitted by the infrared laser light source may be used as a pump light source. In other words, the infrared laser light source may be understood as a pump light source. Optical pumping may be understood as a process of using light to make electrons rise (or "be pumped") from a lower energy level to a higher energy level in atoms or molecules. The pump light source may be understood as a light source that generates light energy to excite a nonlinear crystal, so that the nonlinear crystal performs wavelength conversion (or frequency conversion) on light exciting the nonlinear crystal. This light source may be understood as a pump light source. In this embodiment of this application, the infrared laser generated by the infrared laser light source may cause electrons in the nonlinear crystal to rise (or "be pumped") from a lower energy level to a higher energy level in atoms or molecules, so that a wavelength or a frequency of the infrared laser can be converted in the nonlinear crystal. The infrared laser light source is connected to an input end of a nonlinear optical crystal array, the nonlinear optical crystal array includes one or more nonlinear optical crystals, each nonlinear crystal is configured to perform frequency conversion on the infrared laser and/or spread a wavelength of the infrared laser, and an output end of the nonlinear optical crystal array outputs a visible Gaussian beam.

In an embodiment, power consumption of the used infrared laser light source may be less than or equal to 20 milliwatts (mW).

In this embodiment of this application, when the nonlinear optical crystal array includes a plurality of nonlinear optical crystals, wavelengths of infrared lasers on which any two nonlinear optical crystals perform frequency conversion are different. In other words, frequencies (or frequency ranges) of infrared lasers on which different nonlinear optical crystals perform frequency conversion are different, in other words, phases of infrared lasers on which different nonlinear optical crystals can perform frequency conversion are different. When an infrared laser of a wavelength can exactly match a phase requirement of a nonlinear optical crystal, the infrared laser of the wavelength undergoes frequency conversion and forms visible light obtained after the frequency conversion, and another infrared laser that cannot match the phase requirement of the nonlinear optical crystal continues to be transmitted, and undergoes frequency conversion in a nonlinear optical crystal that can match the wavelength. Wavelengths of infrared lasers on which different nonlinear optical crystals can perform frequency conversion are different, and each nonlinear optical crystal can output a single-mode Gaussian round spot. The infrared laser light source may generate infrared light of wavelengths matching the one or more nonlinear optical crystals for frequency conversion. A plurality of laser beams that have undergone frequency conversion may be combined into one coaxial visible Gaussian beam by using the nonlinear optical crystal array.

In this embodiment of this application, a beam output by the output end of the nonlinear optical crystal array is a coaxial visible Gaussian beam, and the coaxial visible Gaussian beam has a round spot, and has relatively high beam quality, and therefore, is helpful for increasing projection display resolution and may be used as a light source of a laser display device. In the light source system, the infrared laser light source is used to replace a visible-light semiconductor laser light source to greatly reduce power consumption of the laser light source. In addition, compared with an EEL, a VCSEL, and the like in the conventional technology, the light source has a simple structure and a smaller volume. Because only micrometer (μm)-level passive packaging of a pump light source die (configured to generate an infrared laser) and the nonlinear optical crystal array is required, a process is simple, packaging costs are greatly reduced, and packaging efficiency and a yield rate are increased, and therefore requirements of high beam quality, low power consumption, simplified packaging, and a low-cost packaging process are fundamentally met.

In an embodiment, if there is one infrared laser light source, as shown in FIG. 2, the infrared laser light source may generate an infrared laser or near infrared (NIR) light of wavelengths matching the one or more nonlinear optical crystals, in other words, a wavelength range of an infrared laser generated by the infrared laser light source includes wavelengths before the one or more nonlinear optical crystals perform frequency conversion. For example, in this embodiment of this application, the infrared laser light source may be a large-bandwidth pump light source (where for example, a wavelength range is $\Delta\lambda \geq 150$ nm). In this case, the infrared laser light source can match a plurality of different nonlinear optical crystals included in the nonlinear optical crystal array.

In an embodiment, there may be a plurality of infrared laser light sources, and each infrared laser light source may generate an infrared laser or a near infrared laser of a specific wavelength. The infrared laser or the near infrared laser of the specific wavelength can match one of the plurality of nonlinear optical crystals, so that the nonlinear optical crystal matching the wavelength can perform frequency conversion on the infrared laser or the near infrared laser of the wavelength.

In an embodiment, the nonlinear optical crystal array includes one or more of a multi-harmonic generation crystal, a sum-frequency crystal, a difference-frequency crystal, an optical parametric generation crystal, an optical parametric amplification crystal, and an optical parametric oscillation crystal.

The multi-harmonic generation crystal may include one or more of a second harmonic generation crystal, a third harmonic generation crystal, a sum-frequency crystal, and a difference-frequency crystal. The second harmonic generation crystal has a second harmonic generation (SHG) function, the third harmonic generation crystal has a third harmonic generation (THG) function, the sum-frequency crystal has a sum-frequency generation (SFG) function, and the difference-frequency crystal has a difference-frequency generation (DFG) function. For example, the second harmonic generation crystal can achieve functions of doubling a frequency and reducing a wavelength by half, and the third harmonic generation crystal can achieve functions of tripling a frequency and reducing a wavelength to one third of an original wavelength. Input of the sum-frequency crystal may be two or more laser beams, and a frequency of one laser beam output by the sum-frequency crystal is a sum of frequencies of the two or more laser beams. Input of the difference-frequency crystal may be two or more laser beams, and a frequency of one laser beam output by the difference-frequency crystal is a difference between frequencies of the two or more laser beams.

For example, the optical parametric generation crystal may be a nonlinear optical crystal with an optical parametric generation (OPG) function. Input of the optical parametric generation crystal may be one laser beam, output may be a plurality of laser beams, and a sum of frequencies of the plurality of laser beams is a frequency of the input laser beam. The optical parametric oscillation generation crystal may be a nonlinear optical crystal with an optical parametric oscillation (OPO) function, and may convert a laser of one frequency into coherent output of a signal and an idle frequency. The optical parametric amplification crystal may be a nonlinear optical crystal with an optical parametric amplification (OPA) function, and may amplify a frequency of a beam of low-frequency light for output.

For example, in this embodiment of this application, the plurality of nonlinear optical crystals include a plurality of multi-harmonic generation crystals. The plurality of multi-harmonic generation crystals may include at least two of a red multi-harmonic generation crystal, a blue multi-harmonic generation crystal, and a green multi-harmonic generation crystal. In an embodiment, the red multi-harmonic generation crystal may multiply a frequency of a laser of a wavelength 1280 nm to generate a red laser of a wavelength 640 nm. The green multi-harmonic generation crystal may multiply a frequency of a laser of a wavelength 1064 nm to generate a green laser of a wavelength 532 nm. The blue multi-harmonic generation crystal may multiply a frequency of a laser of a wavelength 980 nm to generate a green laser of a wavelength 480 nm.

For example, in this embodiment of this application, when there is one infrared laser light source, the infrared laser light source may generate an infrared laser whose wavelength range is 980 nm to 1280 nm, or the infrared laser light source may generate an infrared laser whose wavelength range is 980 nm to 1064 nm.

When there are a plurality of infrared laser light sources, the infrared laser light sources may generate infrared lasers of different wavelengths. For example, assuming there are four infrared laser light sources, the first infrared laser light source generates near infrared light of a wavelength $\lambda=900$ nm, and the near infrared light passes through the blue multi-harmonic generation crystal to obtain blue light of 450 nm for output. The second infrared laser light source generates near infrared light of $\lambda=1064$ nm, and the near infrared light passes through the green multi-harmonic generation crystal to obtain green light of 532 nm for output. The third infrared laser light source generates near infrared light of $\lambda=1065$ nm, and the near infrared light passes through a purple third harmonic generation crystal to obtain ultraviolet light of 355 nm for output. The fourth infrared laser light source generates near infrared light of $\lambda=1276$ nm, and the near infrared light passes through the red multi-harmonic generation crystal to obtain red light of 638 nm for output.

In an embodiment, a material of the nonlinear optical crystal may be one or more of nonlinear optical crystals such as lithium niobate (LN), potassium dihydrogen phosphate (KDP), potassium dideuterium phosphate (DKDP), lithium iodate (LI), potassium titanium oxide phosphate (KTP), beta barium borate (BBO), lithium triborate (LBO), potassium niobate (KN), cesium triborate (CBO), lithium cesium borate (CLBO), potassium beryllium fluoroborate (KBBF), silver gallium sulfide (AGS), cadmium germanium arsenide (CGA), and zinc germanium phosphide (ZGP). This is not limited in this embodiment of this application.

In the light source system provided in this application, the infrared laser light source is used to replace a visible-light semiconductor laser light source to greatly reduce power consumption of the laser light source. In addition, a plurality of nonlinear optical crystals are used to perform frequency conversion and the like on the infrared laser generated by the infrared laser light source to output visible light, and quality of output beams meets Gaussian distribution, so that the quality of the output beams is greatly improved. The light source has a simple structure and a small volume, and is easy to package and easy to implement.

In an embodiment, when the nonlinear optical crystal array includes a plurality of nonlinear optical crystals, the plurality of nonlinear optical crystals are connected in series. The series connection manner may mean that the plurality of nonlinear optical crystals are arranged in a straight line. For example, an output end of the first nonlinear optical crystal is connected to an input end of the second nonlinear optical crystal, and an output end of the second nonlinear optical crystal is connected to an input end of the third nonlinear optical crystal. In other words, the plurality of nonlinear optical crystals are separately connected by using heads and tails, and the nonlinear optical crystal array has only one input end and one output end as a whole. Alternatively, the series connection manner may mean that the plurality of nonlinear optical crystals are distributed in strips. The example shown in FIG. 1 is a case in which the plurality of nonlinear optical crystals are distributed in series. The plurality of nonlinear optical crystals are connected in series, so that the infrared laser generated by the infrared laser light source can be directly transmitted to the plurality of nonlinear optical crystals in sequence, and therefore the infrared laser can pass through all the nonlinear optical crystals without requiring another optical device to change a transmission path of the infrared light. In addition, infrared lasers are combined into one visible light by using the nonlinear optical crystal for transmission, so that a completely coaxial visible Gaussian laser beam can be generated. A structure is simple and easy to implement, so that complexity of the light source system is further reduced.

In an embodiment, the plurality of nonlinear optical crystals included in the nonlinear optical crystal array may not be connected in series. In this case, an optical device such as a collimator or a refractor needs to be used to process the infrared laser generated by the infrared laser light source, so that the infrared laser generated by the laser light source can pass through the nonlinear optical crystals in sequence.

Figure 3:
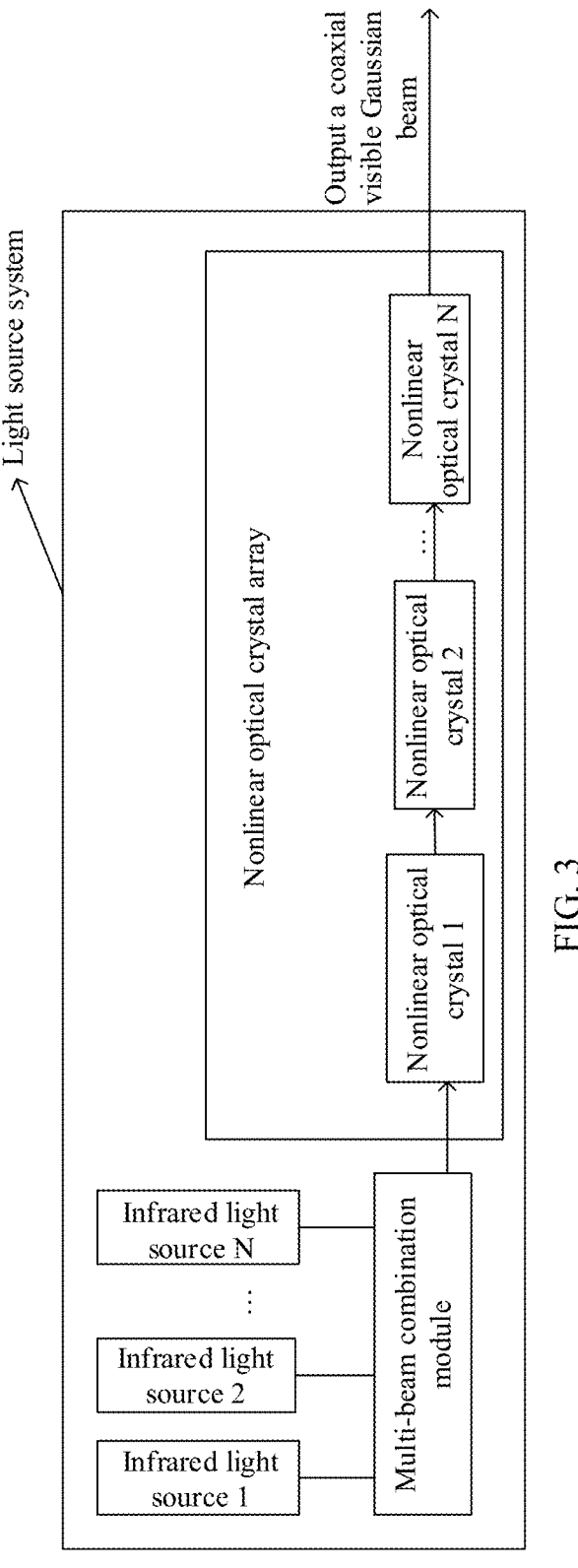
FIG. 3 is a schematic diagram of a structure of another example of a light source system including a plurality of infrared laser light sources according to this application.

In an embodiment, when there are a plurality of infrared laser light sources, wavelengths of infrared lasers generated by different infrared laser light sources are different. FIG. 3 shows a light source system including a plurality of infrared laser light sources. A direction shown by arrows in FIG. 3 is a transmission direction of an infrared laser. The light source system further includes a multi-beam combination module, an input end of the multi-beam combination module is connected to output ends of the plurality of infrared laser light sources, and an output end of the multi-beam combination module is connected to an input end of the nonlinear optical crystal array. The multi-beam combination module is configured to: combine infrared lasers emitted by the plurality of infrared laser light sources into one infrared laser beam, and transmit the infrared laser beam to the nonlinear optical crystal array. In an embodiment, in this embodiment of this application, the multi-beam combination module may also be referred to as a multi-pump beam combination module (system).

Figure 4:
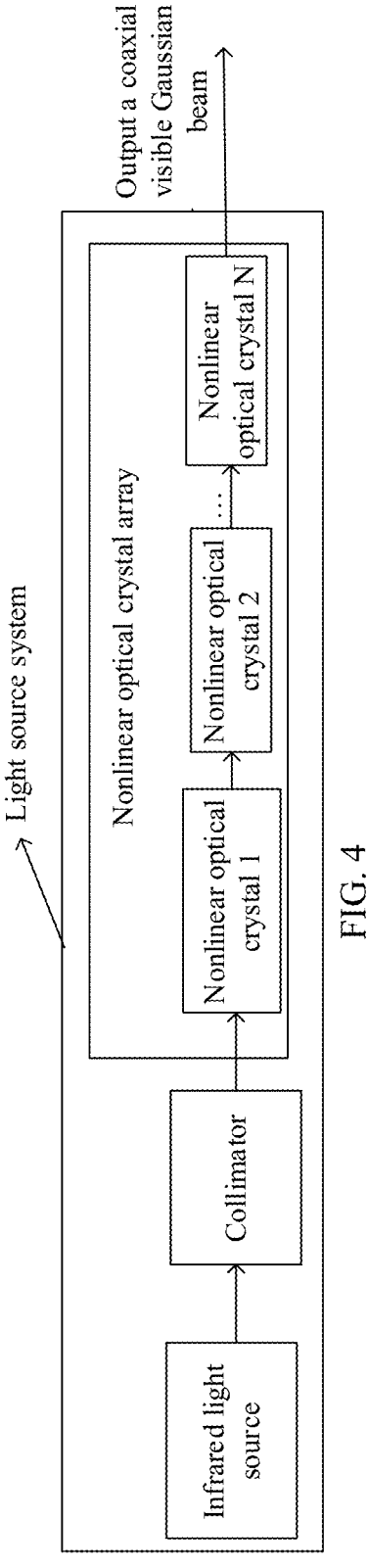
FIG. 4 is a schematic diagram of a structure of another example of a light source system according to this application.

In an embodiment, when there is one infrared laser light source, the light source system further includes a collimator, an input end of the collimator is connected to an output end of the infrared laser light source, and an output end of the collimator is connected to an input end of the nonlinear optical crystal array. The collimator is configured to: collimate an infrared laser emitted by the infrared laser light source, and transmit the collimated infrared laser to the nonlinear optical crystal array. As shown in FIG. 4, on the basis of FIG. 2, a collimator is connected to the output end of the infrared laser light source. The collimator is configured to: perform fast axis collimation on the infrared laser emitted by the infrared laser light source, and input the collimated infrared laser to the nonlinear optical crystal array, to ensure collimation degrees of infrared lasers input to the one or more nonlinear optical crystals, thereby improving infrared laser quality and efficiency of performing frequency conversion by the one or more nonlinear optical crystals. For example, in this embodiment of this application, the collimator may be a fast axis collimator (FAC).

Figure 5:
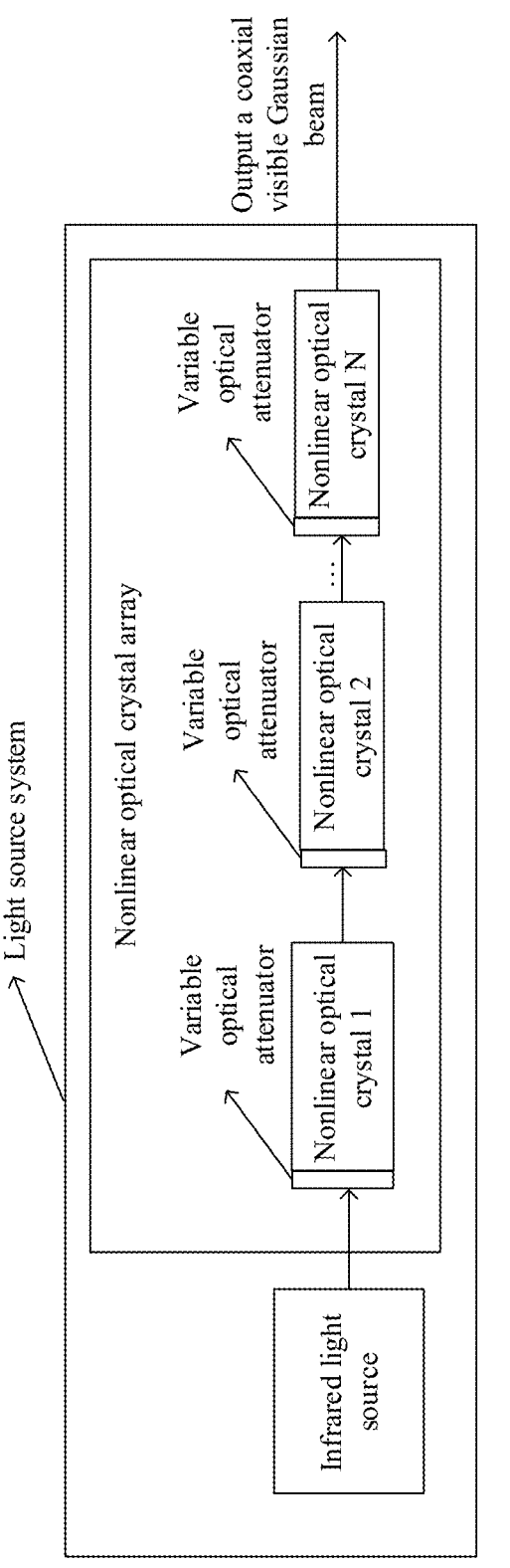
FIG. 5 is a schematic diagram of a structure of another example of a light source system according to this application.

In an embodiment, as shown in FIG. 5, on the basis of FIG. 2, a variable optical attenuator may be disposed before each nonlinear optical crystal, and the variable optical attenuator is configured to adjust power of an infrared laser of a wavelength corresponding to the nonlinear optical crystal. In other words, power ratio modulation is performed on infrared lasers input to each nonlinear optical crystal (for example, power ratio modulation is performed on RGB lasers), to control output power of the infrared lasers. For example, in this embodiment of this application, the variable optical attenuator may be an electrically variable optical attenuator.

In an embodiment, the light source system shown in FIG. 3 or FIG. 4 may also include a plurality of variable optical attenuators.

In an embodiment, antireflection coatings may be further plated on laser input and output end faces of each nonlinear optical crystal, to ensure that a laser in a wavelength range corresponding to the nonlinear optical crystal can completely penetrate the nonlinear optical crystal, thereby improving infrared laser transmission quality and efficiency.

Figure 6:
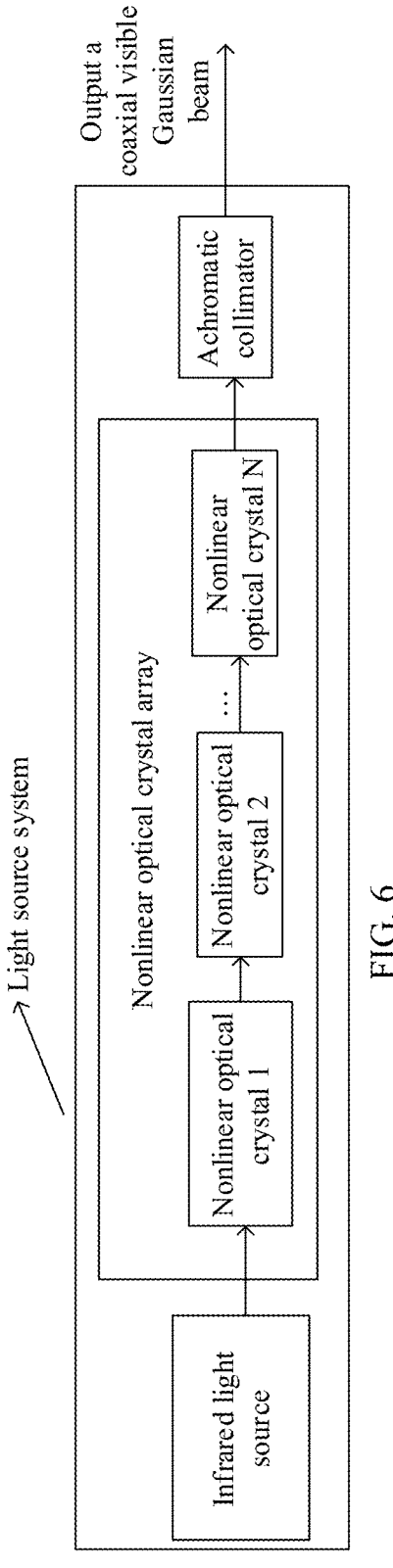
FIG. 6 is a schematic diagram of a structure of another example of a light source system according to this application.

In an embodiment, as shown in FIG. 6, on the basis of FIG. 2, the laser system further includes an achromatic collimator, an input end of the achromatic collimator is connected to the output end of the nonlinear optical crystal array, and the achromatic collimator is configured to collimate a beam output by the nonlinear optical crystal array, so that quality of a beam output by the light source system can be improved.

In an embodiment, the light source system shown in FIG. 3, FIG. 4, or FIG. 5 may also include the achromatic collimator.

Figure 7:
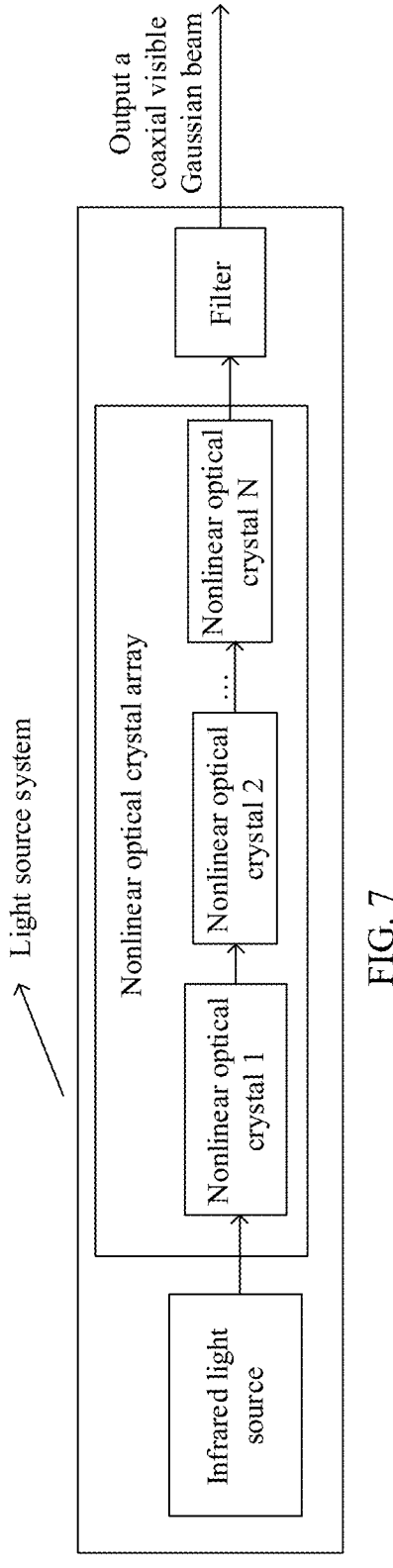
FIG. 7 is a schematic diagram of a structure of another example of a light source system according to this application.

In an embodiment, as shown in FIG. 7, on the basis of FIG. 2, the laser system further includes a filter, the filter is disposed at the output end of the nonlinear optical crystal array, and the filter is configured to: filter the beam output by the nonlinear optical crystal array, and output a filtered beam.

In an embodiment, the light source system shown in FIG. 3 to FIG. 6 may also include the filter. For example, the filter may be disposed at an output end of the achromatic collimator.

Figure 8:
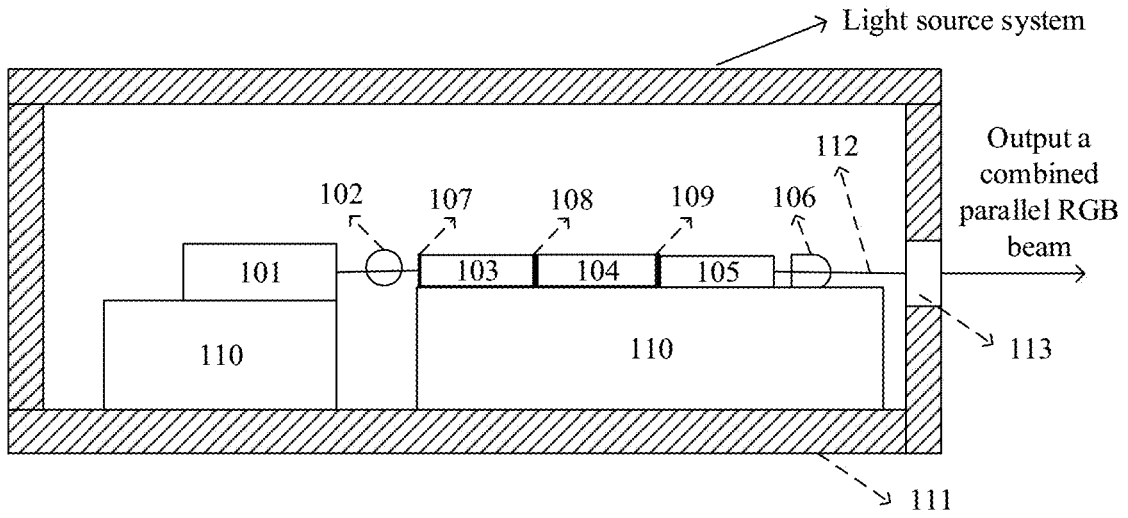
FIG. 8 is a schematic diagram of a structure of another example of a light source system according to this application.

FIG. 8 is a schematic diagram of a structure of another example of a light source system according to this application. As shown in FIG. 8, the light source system includes a broadband infrared semiconductor laser die 101, which is an infrared laser light source and is configured to generate a large-bandwidth infrared laser. For example, a wavelength range of a generated infrared laser is 980 nm to 1280 nm. The infrared semiconductor laser die 101 may be pre-mounted to a carrier base plate 110 through bonding (Die bonding). An FAC collimator 102 is connected after the infrared semiconductor laser die 101, and is configured to perform fast axis collimation on an infrared laser. An output end of the FAC collimator 102 is connected to an input end of a red multi-harmonic generation crystal 103, an output end of the red multi-harmonic generation crystal 103 is connected to an input end of a green multi-harmonic generation crystal 104, and an output end of the green multi-harmonic generation crystal 104 is connected to an input end of a blue multi-harmonic generation crystal 105. In other words, the three multi-harmonic generation crystals constitute a nonlinear optical crystal array, and the three multi-harmonic generation crystals are arranged on the carrier base plate 110 in one row. Electrically variable optical attenuators 107, 108, and 109 are sandwiched between different multi-harmonic generation crystals, and are separately configured to adjust infrared lasers input to different multi-harmonic generation crystals. An achromatic collimator 106 is connected to an output end of the blue multi-harmonic generation crystal 105, and is configured to collimate a beam output by the blue multi-harmonic generation crystal 105, so that the achromatic collimator 106 can output a parallel beam 112. An output end of the achromatic collimator 106 is connected to an input end of a filter 113. The filter 113 may filter out excess infrared pump light in the parallel beam 112, and then a visible combined parallel RGB beam is output from a light outlet of the light source system. In an embodiment, the light source system may be passively packaged in a package 111.

In the light source system shown in FIG. 8, the broadband infrared laser light source 101 on which the FAC collimator 102 performs fast axis collimation outputs an infrared laser (a pump laser) whose wavelength range is 980 nm to 1280 nm. When the infrared laser is transmitted to the red multi-harmonic generation crystal 103, the red multi-harmonic generation crystal 103 multiplies a frequency of an infrared laser of a wavelength 1280 nm to generate a red laser of a wavelength 640 nm. In addition, antireflection coatings of a wavelength range 980 nm to 1070 nm may be plated on two ends of the red multi-harmonic generation crystal 103, to ensure that an infrared laser in the wavelength range can completely penetrate the red multi-harmonic generation crystal 103. When a pump laser output by the red multi-harmonic generation crystal 103 reaches the green multi-harmonic generation crystal 104, a frequency of an infrared laser of a wavelength 1064 nm is multiplied to generate a green laser of a wavelength 532 nm. In addition, antireflection coatings of wavelengths 640 nm and 980 nm are plated on two ends of the green multi-harmonic generation crystal 104, to ensure that lasers of the wavelengths can completely penetrate the green multi-harmonic generation crystal 104. When a pump laser output by the green multi-harmonic generation crystal 104 reaches the blue multi-harmonic generation crystal 105, a frequency of a laser of a wavelength 980 nm is multiplied to generate a blue laser of a wavelength 490 nm. In addition, antireflection coatings of wavelengths 640 nm and 532 nm are plated on two ends of the blue multi-harmonic generation crystal 105, to ensure that lasers of the wavelengths can completely penetrate the blue multi-harmonic generation crystal 105. In this way, a frequency-multiplied RGB laser can be output at the output end of the blue multi-harmonic generation crystal 105, then the achromatic collimator 106 collimates the frequency-multiplied RGB laser beam, then the filter 113 filters out excess infrared pump light, and a visible combined RGB beam is output from the light outlet of the light source system.

As shown in FIG. 8, the light source system used for display needs to perform power ratio modulation on RGB lasers. To achieve this function, the electrically variable optical attenuator 107, 108, and 109 may be separately added before the three multi-harmonic generation crystals, and are respectively used to control output power of infrared lasers of wavelengths 1280 nm, 1064 nm, and 980 nm, so that output power of the RGB lasers is controlled.

In the laser light source shown in FIG. 8, the infrared laser die and the plurality of multi-harmonic generation crystals may be first passively mounted to the carrier base plate, then the FAC collimator and the achromatic collimator may be actively assembled to the carrier base plate, and the package is finally passively packaged, so that a packaging architecture is greatly simplified, and packaging can be completed only through micrometer (μm)-level passive mounting (mounting of the infrared laser die and mounting of the multi-harmonic generation crystals) and micrometer-level passive mounting (packaging of the FAC collimator and the achromatic collimator) processes, thereby greatly reducing packaging costs and increasing packaging efficiency and a yield rate. Because only one infrared laser die is required, power consumption and a volume of the laser light source are greatly reduced, and this is quite helpful for a projection display light source used for a wearable electronic device. In addition, the nonlinear multi-harmonic generation crystal can output a single-mode Gaussian beam, and an output spot is round. This is quite helpful for increasing projection display resolution.

In an embodiment, for example, in the example shown in FIG. 8, only two multi-harmonic generation crystals may be used. For example, only the blue light multi-harmonic generation crystal and the green multi-harmonic generation crystal are integrated. In this case, a wavelength range of an infrared laser output by the infrared semiconductor laser die may be 980 nm to 1064 nm, and a beam output by the light source system includes only a combined beam of blue and green.

It should be understood that, in this embodiment of this application, if there are a plurality of infrared laser light sources, a plurality of infrared semiconductor laser dies may be alternatively used to generate a plurality of infrared lasers of different wavelengths, and a beam combination system may be used to combine the plurality of infrared lasers of different wavelengths and then transmit one combined beam to one or more nonlinear crystals for frequency conversion.

It should be further understood that, in addition to the infrared laser light source generating an infrared laser, a near infrared laser light source may be used to replace the infrared laser light source to generate a near infrared laser. For example, in this embodiment of this application, a plurality of near infrared pump light sources may be used to generate near infrared lasers, and a beam combination system may be used to combine the plurality of near infrared lasers of different wavelengths and then transmit one combined beam to one or more nonlinear crystals for frequency conversion.

It should be understood that the foregoing descriptions are merely intended to help a person skilled in the art better understand embodiments of this application, but are not intended to limit the scope of embodiments of this application. It is clearly that a person skilled in the art can perform various equivalent modifications or changes based on the foregoing examples or combine any two or more of the foregoing plurality of embodiments. A modified, changed, or combined solution also falls within the scope of embodiments of this application.

It should be further understood that, the foregoing descriptions of embodiments of this application focus on differences between the embodiments. For same or similar parts that are not mentioned, refer to the embodiments. For brevity, details are not described herein again.

It should be understood that division of manners, cases, types, and embodiments in embodiments of this application are merely for ease of description, but should not constitute any special limitation, and features in various manners, types, cases, and embodiments may be combined with each other when the features are not mutually exclusive.

It should be further understood that in embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A light source system, applied to a laser projection display device and comprising:
   one or more infrared laser light sources, wherein each of the one or more infrared laser light sources is a pump light source;
   and
   a nonlinear optical crystal array that comprises one or more nonlinear optical crystals, wherein each nonlinear crystal is configured to output a single-mode Gaussian beam, wherein an output end of the nonlinear optical crystal array outputs a coaxial visible Gaussian laser beam, wherein the coaxial visible Gaussian laser beam has a round spot which increase projection display resolution, wherein an input end of the nonlinear optical crystal array is connected to an output end of the one or more infrared laser light sources, wherein the coaxial visible Gaussian laser beam provides a light source for laser projection display; wherein the nonlinear optical crystal array is configured to:
   perform frequency conversion on an infrared laser generated by the one or more infrared laser light sources, and
   output a laser obtained after the frequency conversion.

2. The light source system according to claim 1, wherein when the nonlinear optical crystal array comprises a plurality of nonlinear optical crystals, the plurality of nonlinear optical crystals are connected in series.

3. The light source system according to claim 1, wherein when the nonlinear optical crystal array comprises a plurality of nonlinear optical crystals, wavelengths of infrared lasers on which any two nonlinear optical crystals perform frequency conversion are different.

4. The light source system according to claim 1, wherein the nonlinear optical crystal array comprises one or more of a multi-harmonic generation crystal, a sum-frequency crystal, a difference-frequency crystal, an optical parametric generation crystal, an optical parametric amplification crystal, and an optical parametric oscillation crystal.

5. The light source system according to claim 1, wherein when there is one infrared laser light source, a wavelength range of an infrared laser generated by the infrared laser light source comprises wavelengths before the one or more nonlinear optical crystals comprised in the nonlinear optical crystal array perform frequency conversion.

6. The light source system according to claim 1, wherein when there are a plurality of infrared laser light sources, wavelengths of infrared lasers generated by different infrared laser light sources are different;
   wherein the light source system further comprises a multi-beam combination module;
   wherein an input end of the multi-beam combination module is connected to output ends of the plurality of infrared laser light sources, and an output end of the multi-beam combination module is connected to the input end of the nonlinear optical crystal array; and wherein the multi-beam combination module is configured to:

combine infrared lasers emitted by the plurality of infrared laser light sources into one infrared laser beam, and transmit the infrared laser beam to the nonlinear optical crystal array.

7. The light source system according to claim 1, wherein when there is one infrared laser light source, the light source system further comprises a collimator;

wherein an input end of the collimator is connected to an output end of the infrared laser light source, and an output end of the collimator is connected to the input end of the nonlinear optical crystal array; and wherein the collimator is configured to:

collimate an infrared laser emitted by the infrared laser light source, and transmit the collimated infrared laser to the nonlinear optical crystal array.

8. The light source system according to claim 1, wherein a variable optical attenuator is disposed before each of the one or more nonlinear optical crystals, and wherein the variable optical attenuator is configured to adjust power of an infrared laser of a wavelength corresponding to the nonlinear optical crystal.

9. The light source system according to claim 1, wherein the light source system further comprises an achromatic collimator, wherein an input end of the achromatic collimator is connected to the output end of the nonlinear optical crystal array, and wherein the achromatic collimator is configured to collimate a beam output by the nonlinear optical crystal array.

10. The light source system according to claim 1, wherein the light source system further comprises a filter, wherein the filter is disposed at the output end of the nonlinear optical crystal array, and wherein the filter is configured to filter a beam output by the nonlinear optical crystal array.

11. The light source system according to claim 1, wherein the nonlinear optical crystal array comprises:

a red multi-harmonic generation crystal;

a blue multi-harmonic generation crystal; and a green multi-harmonic generation crystal.

12. A laser projection display device, comprising;

a projection objective lens; and a light source system, comprising:

one or more infrared laser light sources, wherein each of the one or more infrared laser light sources is a pump light source; and a nonlinear optical crystal array that comprises one or more nonlinear optical crystals, wherein each nonlinear crystal is configured to output a single-mode Gaussian beam, wherein an output end of the nonlinear optical crystal array outputs a coaxial visible Gaussian laser beam, wherein the coaxial visible Gaussian laser beam has a round spot which increase projection display resolution, wherein an input end of the nonlinear optical crystal array is connected to an output end of the one or more infrared laser light sources, wherein the coaxial visible Gaussian laser beam provides a light source for laser projection display;

wherein the nonlinear optical crystal array is configured to:

perform frequency conversion on an infrared laser generated by the one or more infrared laser light sources, and output a laser obtained after the frequency conversion,;

wherein an output end of the light source system is connected to the projection objective lens, and wherein the projection objective lens is configured to transmit, to a projection display screen, a coaxial visible Gaussian laser beam output by the light source system.

13. The laser projection display device according to claim 12, wherein when the nonlinear optical crystal array comprises a plurality of nonlinear optical crystals, the plurality of nonlinear optical crystals are connected in series.

14. The laser projection display device according to claim 12, wherein when the nonlinear optical crystal array comprises a plurality of nonlinear optical crystals, wavelengths of infrared lasers on which any two nonlinear optical crystals perform frequency conversion are different.

15. The laser projection display device according to claim 12, wherein the nonlinear optical crystal array comprises one or more of a multi-harmonic generation crystal, a sum-frequency crystal, a difference-frequency crystal, an optical parametric generation crystal, an optical parametric amplification crystal, and an optical parametric oscillation crystal.

16. The laser projection display device according to claim 12, wherein when there is one infrared laser light source, a wavelength range of an infrared laser generated by the infrared laser light source comprises wavelengths before the one or more nonlinear optical crystals comprised in the nonlinear optical crystal array perform frequency conversion.

17. The laser projection display device according to claim 12, wherein when there are a plurality of infrared laser light sources, wavelengths of infrared lasers generated by different infrared laser light sources are different;

wherein the light source system further comprises a multi-beam combination module;

wherein an input end of the multi-beam combination module is connected to output ends of the plurality of infrared laser light sources, and an output end of the multi-beam combination module is connected to the input end of the nonlinear optical crystal array; and wherein the multi-beam combination module is configured to:

combine infrared lasers emitted by the plurality of infrared laser light sources into one infrared laser beam, and transmit the infrared laser beam to the nonlinear optical crystal array.

18. The laser projection display device according to claim 12, wherein when there is one infrared laser light source, the light source system further comprises a collimator;

wherein an input end of the collimator is connected to an output end of the infrared laser light source, and an output end of the collimator is connected to the input end of the nonlinear optical crystal array; and wherein the collimator is configured to:

collimate an infrared laser emitted by the infrared laser light source, and transmit the collimated infrared laser to the nonlinear optical crystal array.

19. The laser projection display device according to claim 12, wherein a variable optical attenuator is disposed before each of the one or more nonlinear optical crystals, and wherein the variable optical attenuator is configured to adjust power of an infrared laser of a wavelength corresponding to the nonlinear optical crystal.

20. The laser projection display device according to claim 12, wherein the light source system further comprises an achromatic collimator, wherein an input end of the achromatic collimator is connected to the output end of the nonlinear optical crystal array, and wherein the achromatic collimator is configured to collimate a beam output by the nonlinear optical crystal array.

\* \* \* \* \*